INVENTOR
Ronald F. Brennen
BY
ATTORNEY

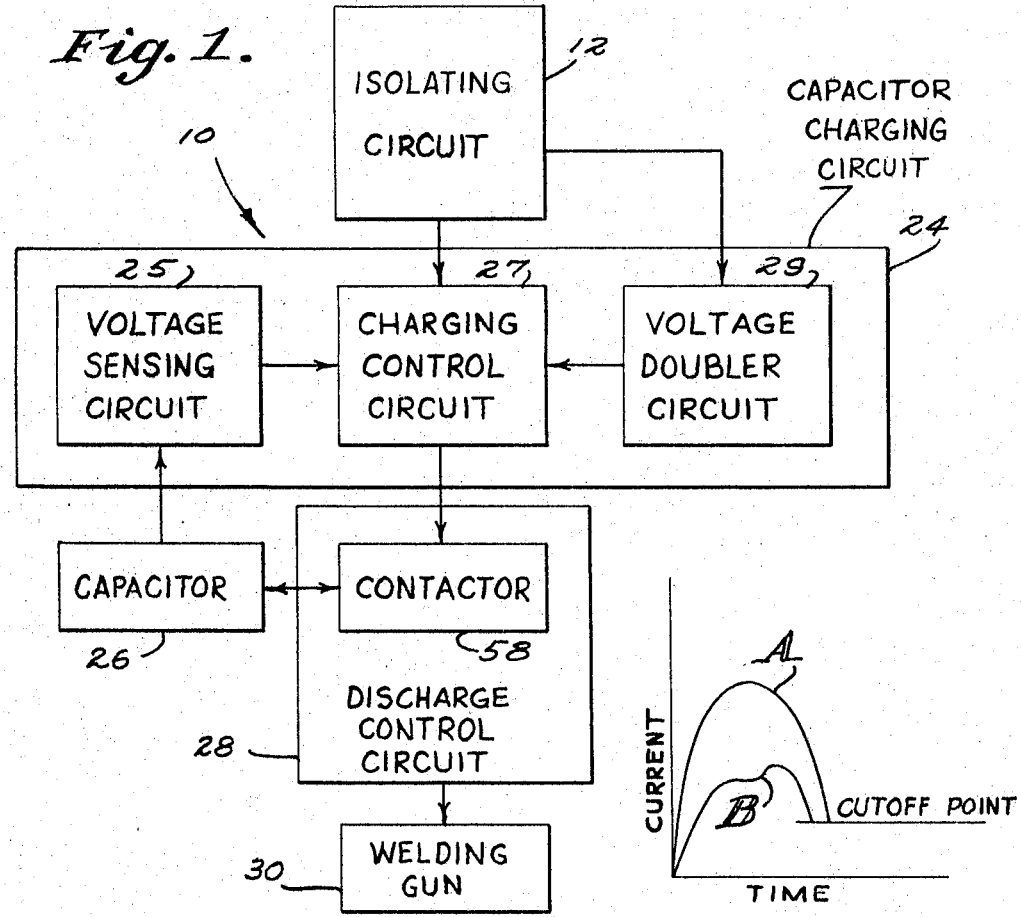
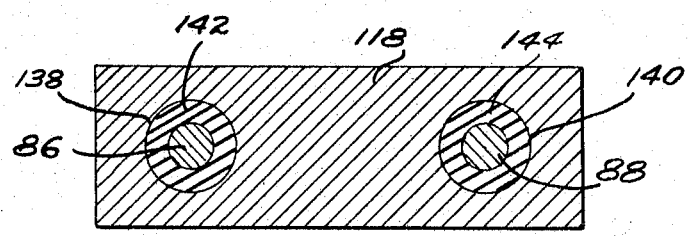

United States Patent Office 3,423,558
Patented Jan. 21, 1969

3,423,558
STORED ENERGY ELECTRIC STUD
WELDING APPARATUS
Ronald F. Brennen, Pompano Beach, Fla., assignor to Uniweld Products, Inc., Fort Lauderdale, Fla., a corporation of Delaware
Filed Feb. 23, 1966, Ser. No. 529,487
U.S. Cl. 219—98                   13 Claims
Int. Cl. B23k 11/26

This invention relates to lightweight, portable patentably novel electric welding apparatus, commonly referred to as stud welding apparatus, utilizing capacitor discharge means, such as a storage capacitor, operable in such a manner that the discharge of said capacitor discharge means is effectively slowed down without any unnecessary heat energy dissipation, thereby preventing improper melting of the stud to be welded to its base and also thereby preventing unnecessary burning of said base with the result of a clean and permanent joining of the stud to its base. In the patentably novel apparatus of this invention, there is attained a drawn arc between the stud and its base, and the heat energy is not unnecessarily dissipated during the joining of the stud to its base.

The patentably novel stud welding apparatus of this invention is utilized in building construction or the like to fasten small cross-section, elongate elements such as threaded studs to sheet metal surfaces, such as heating and air conditioning ducts to enable insulating material or the like to be affixed thereto.

The patentably novel electric welding apparatus of this invention is primarily utilized in building construction and is easily portable and particularly relatively small in size and light in weight. This patentably novel electric stud welding apparatus is used on location and at long distances from commercial power lines, and is powered by either portable generating equipment or long extension cords and is such that its input power requirements are maintained to the minimum peak values that can be reasonably obtained consistent with the output energy levels and with the necessarily intermittent usage thereof for the purpose of keeping the fluctuations of the input power required to minimum. Therefore, the high energy demands of the apparatus are reflected only minimally at the input to the welding apparatus, while the high energy levels thereof are applied to the weld joint for short time periods.

The patentably novel electric welding apparatus of this invention is such that the output energy applied to the weld is reliably consistent and that the time interval during which the welding energy is applied is of the correct duration. With the electric stud welding apparatus of this invention, the welding duration is not too short, the temperature of the weld does not become excessively high and the areas surrounding the weld do not remain cold, with the result that there is not too rapid cooling, or quenching, of the weld joint, and there is not caused any excessive crystallization at the weld joint, or voids in the weld joint, with the result that strong and ductile weld joints are produced. In joining the stud to the base with the apparatus herein, the stud is at the start in contact with the base and a pilot current is passed between said stud and base. Then said stud is separated for a small distance from said base and a pilot arc is drawn forming an ionized path therebetween. An arc for fusing said base and stud then passes along said ionized path, and said stud is then returned to be in contact with said base.

With the patentably novel electric stud welding apparatus of this invention two conductive elements are joined, or welded, to each other, one of said elements being a stud, by initiating a low power pilot arc between the stud and a conductive surface while at close proximity forming an ionized path therebetween and then separating said stud from the surface a short distance concurrently with the application of full welding power along the ionized path created by the pilot arc. The effect is that of drawing the arc outwardly between the separaing members. At substantially the instant that the welding arc is extinguished, although occasionally immediately prior thereto, the stud is plunged to the surface, and the fused material at the end of the stud and on the surface coalesce to produce the desired weld.

Heretofore, it has been suggested to utilize a capacitor to store electrical energy applied thereto at relatively low power levels and to release such stored energy rapidly, at high power levels through the weld area to produce fusion thereat. Such heretofore known systems, however, have not been satisfactory because of their excessive size and weight, because of their excessively fluctuating input power demands, and because of the difficulty in controlling the duration of the energy discharge therefrom. Heretofore, storage capacitor discharge rate has been retarded by means of a ballast coil or inductor connected in series with the output wires, but such heretofore known devices are quite bulky, massive and heavy, and comprise a number of turns of heavy cable around an iron core and require a series connection with at least one of the output wires and causes substantial heat and other losses within the electrical welding apparatus.

The patentably novel electric welding apparatus of this invention comprises, in combination, isolating circuit means for isolating the gun from earth ground, the isolating circuit means including connection control relay means for automatically selectively connecting the hot wire of the input alternating current power line to the switching and control means within said apparatus and connecting the ground wire of the input power line to the output ground circuitry of the apparatus. Said isolating circuit means of course includes two relays and two diodes in series. Since the storage capacitor is preferably charged to a potential of approximately at least 200 volts, and the usual potential available from a conventional single phase line is approximately 115 volts, transformerless voltage doubler circuit means controlled by voltage sensing means responsive to the charge existing on said capacitor is included to enable said capacitor to be so charged without the use of a heavy conventional transformer. Also, capacitor discharge circuit means, including magnetic circuit means in parallel with the output lines is herein included for preventing too rapid a discharge of said storage capacitor for purpose of preventing excessive heating of the stud and base and, of course, the weld joint.

An object of this invention is to provide a lightweight and portable electric stud welding apparatus of the capacitor discharge type wherein the storage capacitor is charged without the requirement for excessive peak input power, and which is controllably discharged at a desired power level to a weld joint area without the formation of excessive heat energy at the stud, the base, and the weld joint area.

Another object of this invention is to provide a lightweight and portable electric stud welding apparatus of the storage capacitor discharge type including a transformerless charging circuit means, including a voltage multiplier circuit, for said capacitor thereby enabling the charging rate of the capacitor to be controlled by voltage sensing means responsive to said capacitor charge.

A further object of this invention is to provide a lightweight and portable electric stud welding apparatus of the storage capacitor discharge type including discharge control means therefor for regulating the rate of discharge therefrom through a drawn arc to enable a proper heating rate and a proper duration of heating at the weld joint area.

Still another object of this invention is to provide a lightweight and portable electric stud welding apparatus of such structure as to remove shock hazards, without the use of an isolation transformer.

Other objects and features of this invention will become readily apparent from the following detailed description which is not limiting but only descriptive of the invention. Like numbers designate like parts.

FIGURE 1 is a block diagram of the electric stud welding apparatus of this invention.

FIGURE 3 is a graph in representative form illustrating a typical charging current-time curve of a conventional capacitor charging circuit and of the typical charging current-time curve of the storage capacitor charging circuit in the apparatus of this invention.

FIGURE 4 is a sectional view taken along line 4—4 of FIGURE 2.

Figure 2:
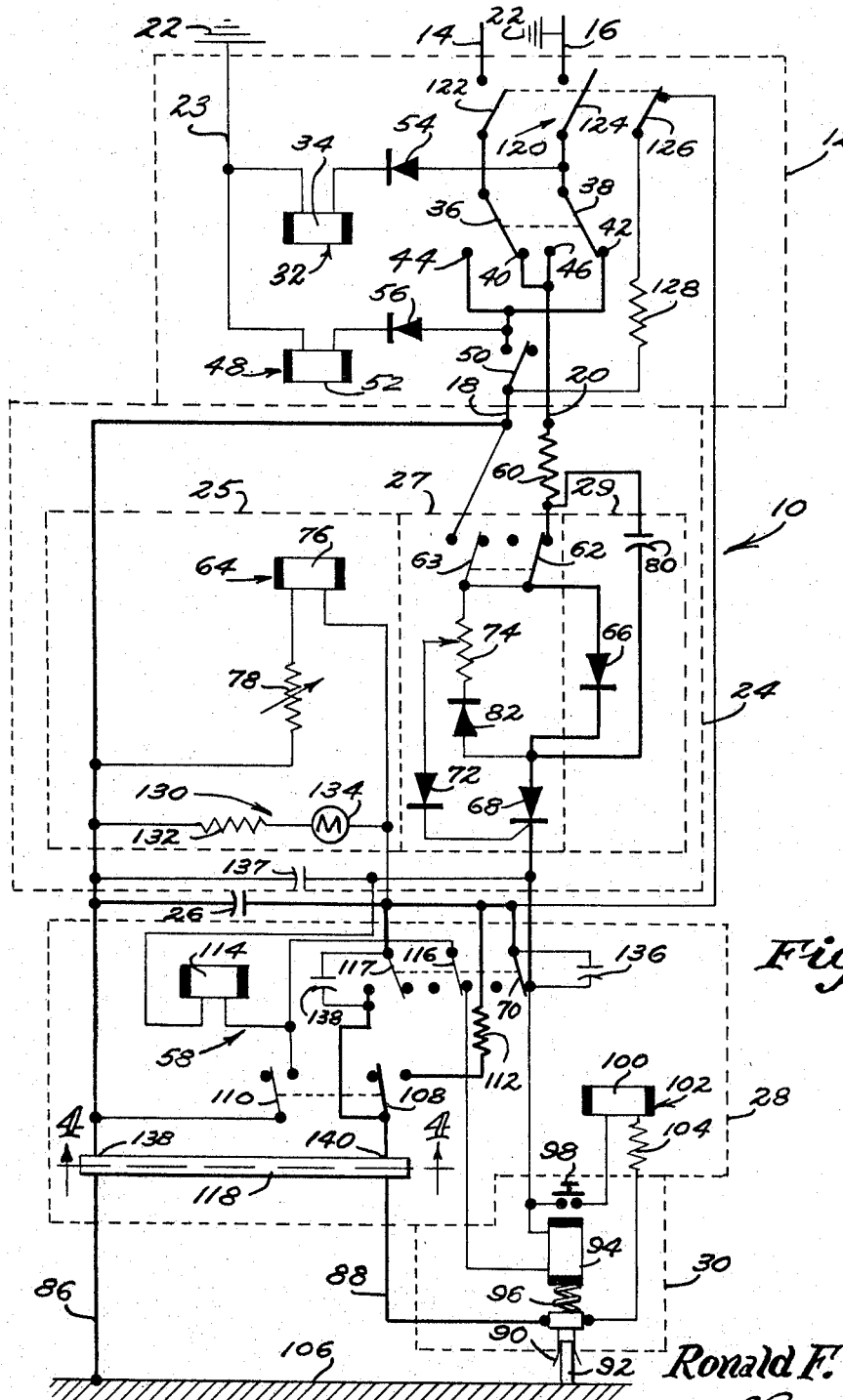
FIGURE 2 is a schematic wiring diagram of the electric stud welding apparatus of this invention.

More specifically, the electric welding apparatus 10, connected to a conventional 110–120 volt alternating power source (not shown), comprises isolating circuit 12 having line input wires 14 and 16, output wires 18 and 20 and ground connections 22, 22, and capacitor charging circuit 24 for charging storage capacitor 26, and capacitor discharge control circuit 28, and stud welding gun mechanism 30.

Preferably, for reasons of safety, the output wire 18 of the isolating circuit 12 is connected to the negative, or ground, side of the input lines 14 and 16 because the wire 18 is connected directly to the negative output wire 86 of the apparatus 10. Also, preferably for reasons of safety, the ground wire 23 is connected to earth ground 22 when apparatus 10 is in operation. Said isolating circuit includes double pole double throw relay 32 having control coil 34 and a pair of transfer switch elements 36 and 38, controlled by coil 34. In the unactuated configuration of relay 32, said transfer elements 36 and 38, connected to input lines 14 and 16, are connected with normally closed contacts 40 and 42, respectively. In the actuated configuration of relay 32 transfer elements 36 and 38 are connected to normally open contacts 44 and 46, respectively. Connected contacts 40 and 46 are connected to output wire 20, while connected contacts 44 and 42 are connected to output wire 18 so that relay 32 is effective for operably connecting input wire 14 to output wire 20 and input wire 16 to output wire 18 when relay 32 is in the unactuated configuration thereof and for operably connecting input wire 14 to output wire 18 and input wire 16 to output wire 20 when relay 32 is in the actuated configuration thereof.

Relay coil 34 of relay 32 is connected between and to input wire 16 and ground wire 23 so that, if input wire 16 be connected to the negative, or ground, side of the 110–112 volt alternating current power line and input wire 14 be connected to the positive or hot side of said power line, then substantially no potential difference will exist between grounded input wire 16 and ground wire 23, little or no current will flow through relay coil 34 and relay 32 will remain unactuated connecting grounded input wire 16 with output wire 18 and hot input wire 14 with output wire 20. If, however, input wire 16 be connected to the hot side of said power line, then a potential difference will exist between input wire 16 and ground wire 23 and accordingly across relay coil 34 thereby causing relay 32 to be actuated to connect grounded input wire 14 with output wire 18 and hot input wire 16 with output wire 20.

For the purpose of making certain that ground wire 23 is properly connected to earth ground 22, relay 48 having normally open contact pair 50 and operating coil 52 is connected between and to output wire 18 and ground wire 23. Normally open contact pair 50 is connected in series with output wire 18, and operating coil 52 is connected to output wire 18 between relay 32 and contact pair 50 so that, if ground wire 23 be not properly connected to earth ground 22, relay 48 will remain unactuated thereby preventing current flow through output wire 18. If, however, ground wire 23 be properly connected to earth ground 22, relay 48 will be actuated thereby completing the connection between output wire 18 and the appropriate one of said input wires 14 and 16. Diodes 54 and 56 are connected in series with relay coils 34 and 48, respectively, to preclude the formation of a feedback path through relay coils 34 and 52 and erroneous operation thereof if ground wire 23 be not properly connected. While contact pair 50 is preferably connected in series with output wire 18, it is readily apparent that a similar function and operation would be obtained if contact pair 50 were connected with output wire 20.

Capacitor charging circuit 24 includes voltage sensing circuit 25, charging control circuit 27, and voltage doubler circuit 29. Capacitor charging circuit 24 charges storage capacitor 26 from input wires 14 and 16 to a voltage of approximately 200 volts without the use of a step-up transformer, motor generator set, or other heavy device such as is used in heretofore known welding apparatus. Furthermore, capacitor charging circuit 24 charges storage capacitor 26 in a plurality of distinct steps to reduce the input current requirements while charging storage capacitor 26 in a minimum time. Voltage sensing circuit 25 includes variable resistor 78 and operating coil 76 of relay 64. Charging control circuit 27 includes relay contacts 62 and 63, potentiometer resistor 74, diode or rectifier, 82, controlled rectifier 68, and rectifier 72. Voltage doubler circuit 29 includes diode 66 and capacitor 80, which is charged during alternate half cycles and discharges in series with the input voltage during the other alternate half cycles, all as clearly shown in the appended drawings. Diode 66 prevents feedback. Resistor 60 is connected in series with isolating circuit 12 for the purpose of limiting the peak initial charging current of storage capacitor 26.

It is well known that the charging curve of a capacitor is essentially a high peak of current followed by a drooping curve to approximately zero, that is, when a voltage is applied to an uncharged capacitor, there is an inrush of current, the peak value of which is limited only by the applied voltage and the impedance of the circuit (see curve A of FIGURE 3). In the patentably novel apparatus herein disclosed said high peak is reduced. Heretofore known devices have attempted to limit the peak current by means of added impedances connected in series with the capacitor, but such added impedances increase the charge time for the capacitor and produce added inefficiencies due to heat and similar losses in the added impedance.

Since the peak charging current is also a function of the applied voltage, charging circuit 24 herein is arranged to apply a low initial charging voltage to storage capacitor 26 through limiting resistor 60 and to increase the charging voltage applied to capacitor 26 automatically when storage capacitor 26 has been charged thereby to approximately one-half of the desired full charge potential. By applying the charging potential in a plurality of increasing steps, the charging time and peak charging current are minimized together with fluctuations in the charging current. Charging circuit 24 is selectively connected with capacitor 26 through relay, or contactor, 58 to initially charge storage capacitor 26 through limiting resistor 60, normally closed contact set 62 of control relay 64, diode rectifier 66, controlled rectifier 68 and normally closed contact pair 70 of the contactor 58, all connected in series and to one side of storage capacitor 26. Limiting resistor 60 is connected with wire 20 which is maintained at all times in connection with the hot one of input wires 14 and 16 by isolating circuit 12. Limiting resistor 60 controls the peak charging current, and rectifiers 66 and 68 rectify the alternating current from input wires 14 and 16 to provide a direct current for charging storage capacitor 26. The other side of storage capacitor 26 is connected with wire 18 so that storage capacitor 26 is connected directly with input wires 14 and 16 through limiting resistor 60 and the initial charging potential applied to storage capacitor 26 is substantially the potential of input wires 14 and 16, which is generally 110–120 volts. Controlled rectifier 68 is fired during the initial charging period of storage capacitor 26 through input lines 14 and 16 by a positive voltage applied to the gate thereof through diode rectifier 72 and potentiometer resistor 74 connected with contact pair 62 of relay 64 at the junction thereof with diode rectifier 66. As storage capacitor 26 becomes charged during its initial charging period to a potential approaching the initial charging potential, that is, approaching the potental on input wires 14 and 16, relay 64 is automatically actuated to terminate the initial charging period and to institute an increase in the charging potential applied to storage capacitor 26. Operating coil 76 of relay 64 and variable resistor 78 connected in series therewith are connected across storage capacitor 26 so that the potential applied to operating coil 76 of relay 64 is directly dependent upon and a function of the potential of storage capacitor 26. Variable resistor 78 enables the exact relationship between the operation of relay 64 and the charge on storage capacitor 26 to be varied so that the potential of storage capacitor 26 at which relay 64 will be actuated can be selected or controlled. The setting of variable resistor 78 is preferably made, or selected, so that relay 64, including coil 76, will be actuated when the potential of storage capacitor 26 is somewhat lower than the normal potential of input wires 14 and 16 with the result that the initial charging period of storage capacitor 26 will be terminated when the potential on said capacitor 26 is somewhat below the normal potential of input wires 14 and 16 and preferably slightly below, or substantially the same, as the lowest input potential thereof to charge properly said capacitor 26 to enable a proper weld to be effectuated thereby. If the adjustment of variable resistor 78 be selected with the foregoing criteria in view, the initial charging period will be terminated upon the decrease of the charging rate because of the decrease in the potential difference between input potential and capacitor potential, normal potential being applied to the input wires 14 and 16 or storage capacitor 26 being charged to its maximum directly attainable from input wires 14 and 16. In this manner, in normal operation, the initial charging period will remain of short duration since a potential difference will always be present during the initial charging period and the initial charging period will terminate while a substantial charging current is still flowing into the capacitor 26, as clearly shown in the appended drawings, particularly FIGURES 2 and 3.

Upon energization of operating coil 76, of relay 64 by storage capacitor 26, contact set 62, of relay 64, disconnects diode rectifier 66 and potentiometer resistor 74 from limiting resistor 60, and normally open contact set 63, of relay 64, connects them with wire 18. With contact set 63 connecting them with wire 18, when the alternating current through wires 18 and 20 turns negative at wire 18 on alternating half cycles, charging capacitor 80 connected between the junction of rectifiers 66 and 68 and wire 20 is charged to the input wire potential. Diode rectifier 82 connected in series with potentiometer resistor 74 prevents current flow therethrough when wire 18 is positive, and controlled rectifier 68 is rendered non-conductive. During the opposite alternate half cycles, that is, when wire 20 is positive, capacitor 80 discharges in series with the line potential, resulting in a potential twice the input potential being applied to storage capacitor 26 through controlled rectifier 68 which is gated open by the bias developed by potentiometer resistor 74 and diode rectifier 72. Storage capacitor 26 is thusly initially charged by an initial low charging potential, and then, when storage capacitor 26 has been charged to approximately one-half of the full desired charge, the charging potential is increased to a value somewhat greater than the final charge desired to assure that the desired charge will be attained even at low input potentials. Controlled rectifier 68 is biased on its gate through diode rectifier 72, potentiometer resistor 74 and diode rectifier 82. As the voltage on storage capacitor 26 rises the negative charge of said capacitor 26 flows through potentiometer resistor 74 through the gate of controlled rectifier 68 through diode rectifier 72. More negative bias is applied to the gate of controlled rectifier 68 as the arm of potentiometer resistor 74 moves away from diode rectifier 82, and controlled rectifier 68 is cut off at a lower voltage on storage capacitor 26.

Referring to FIGURE 3 of the appended drawings, curve A is a graph of a normal charging current versus time for charging said capacitor 26 directly from a 230 volt line starting with the capacitor 26 in its fully discharged state, and curve B is a graph of a charging current versus time for charging said capacitor 26 in the plurality of steps as in the apparatus of this invention. It is readily apparent that the charging current required by the apparatus herein is only about one-half that required by heretofore known apparatus and that the charging time remains substantially the same.

After said capacitor 26 has been charged to the operating potential thereof, as hereinbefore pointed out, controlled rectifier 68 stops conducting, thereby disconnecting capacitor 26 from input wires 14 and 16, but, if the charge on said capacitor 26 should leak off or be otherwise dissipated, controlled rectifier bias will be reduced and said capacitor will be automatically retained at its full operating potential.

Discharge control circuit 28 includes contactor 58. limiting resistor 112, relay 102, relay 102 including coil 100 and normally open contact sets 108 and 110, resistor 104, trigger switch 98, magnetic circuit 118, negative output bus wire 86, and positive output bus wire 88. When contactor 58, including operating coil 114, normally open contacts 117, normally closed auxiliary contacts 116, and normally closed auxiliary contacts 70, is actuated, contacts 70 open thereby disconnecting storage capacitor 26 from charging circuit 24.

Stud welding gun 30 comprises chuck 90 for gripping and retaining stud 92 and electrically connecting stud 92 to positive output wire 88 of welding apparatus 10. Chuck 90 is operatively associated with motor means such as solenoid coil 94 which is so constructed and arranged that energization of solenoid coil 94 draws chuck 90 and attached stud 92 towards solenoid coil 94. Biasing means such as spring 96 is provided between solenoid coil 94 and chuck 90 to bias said chuck 90 outwardly of solenoid coil 94 enabling solenoid coil 94 to draw chuck 90 and stud 92 inwardly when solenoid coil 94 is energized, and spring 96 pushes chuck 90 and stud 92 outwardly when solenoid coil 94 is not energized. Normally open trigger, or push button type, switch 98 is also provided structurally associated with gun 30 to enable operation of capacitor discharge control circuit 28 by an operator by means of gun 30.

Trigger switch 98 is connected in series between the output side of controlled rectifier 68 and one side of operating coil 100 of relay 102. The other side of operating coil 100 of relay 102 is connected, through series resistor 104, to chuck 90 of gun 30 so that relay 102 is operated only when trigger switch 98 is operated and stud 92 is in contact with work surface 106 connected with negative output bus wire 86. Series resistor 104 is preferably of a sufficiently high resistance as to preclude dangerous shock potentials from being present between gun 30 and surface 106 at all times except when storage capacitor 26 is discharged therebetween, thereby to provide an additional safety feature in the apparatus of this invention.

Relay 102 comprises two normally open contact pairs 108 and 110, contact set, or pair, 108 being connected in series with pilot current limiting resistor 112 connected to the positive side of said capacitor 26 and positive output wire 88 so that capacitor 26 is discharged through said limiting resistor 112 upon actuation of relay 102.

Contact set, or pair, 110 of relay 102 is connected in series with the negative side of capacitor 26 and one side of operating coil 114 of contactor 58, the other side of operating coil 114 being connected with the output of controlled rectifier 68, the contact set or pair 110 also being connected with normally closed contact set or pair 116. Solenoid coil 94 of gun 30 is in turn connected with normally closed contact set, or pair, 116 and with the output of controlled rectifier 68 so that, upon actuation of relay 102, contact set, or pair, 110 will be actuated to energize operating coil 114 of contactor 58 and solenoid coil 94 of gun 30. Upon actuation of contactor 58, normally closed contact set, or pair, 116 thereof is opened, de-energizing solenoid coil 94 of gun 30. Output wire 88 is also connected to normally open contact set, or pair, 117 of contactor 58 so that actuation of contactor 58 will connect storage capacitor 26 directly to chuck 90 of gun 30.

With stud 92 properly engaged in chuck 90 and with stud 92 in contact with work surface 106, if switch 98 is closed, operating coil 100 of relay 102 is energized through switch 98, resistor 104, chuck 90, stud 92, work surface 106, and negative output wire 86, thereby closing contact sets, or pairs, 108 and 110 of relay 102. The closing operation of contact set, or pair, 108 initiates a pilot current through limiting resistor 112 from storage capacitor 26 causing said pilot current to flow between stud 92 and work surface 106. The concurrent closing of contact set, or pair, 110 initiates a flow of current from input wires 14 and 16 through operating coil 114 of contactor 58 and contact set 116 and solenoid coil 94 connected in series therewith. The current flow through solenoid coil 94 of gun 30 causes chuck 90 and attached stud 92 to be attracted towards solenoid coil 94 against the biasing of spring 96, and stud 92 is raised above work surface 106, and a pilot arc is drawn between stud 92 and work surface 106 forming an ionized path therebetween. As contactor 58 operates, due to energizing of operating coil 114 thereof, through contact set, or pair, 110, contact set, or pair, 116 opens, de-energizing solenoid coil 94. At substantially the same time, contact set, or pair, 117 closes the direct path betwen storage capacitor 26 and chuck 90 of gun 30 enabling full welding power to flow across the ionized path existing between stud 92 and work surface 106 to melt the end portion of stud 92 and a portion of work surface 106 adjacent and opposite said stud 92.

Shortly thereafter spring 96 returns stud 92 into contact with work surface 106 enabling the molten end portion of stud 92 and the molten portion on work surface 106 to coalesce, or fuse, and complete the weld joint.

Since the discharge of storage capacitor 26 upon being directly connected across stud 92 and work surface 106 is extremely short in time duration and is extremely high in current intensity, there is specifically included in discharge circuit 28 means for limiting the peak discharge current and extendng the duration of the arc, thereby to prevent excessive heating of stud 92 and work surface 106. The rapid discharge normally occurring with a direct connection of storage capacitor 26 with stud 92 and work surface 106 results in poor quality welds accompanied by a tendency of the stud to break off at the work surface because of strains resulting, among other causes, from low environmental temperatures and rapid quenching of the weld joint. Such rapid heating of the weld joint area, without any substantial heating of the area surrounding the weld joint results in an extremely hard, brittle weld joint due to rapid quenching of the weld area. If, however, the discharge rate is retarded, then such rapid cooling of the weld area is prevented and a ductile and reliable weld joint results.

The patentably novel electric welding apparatus 10 includes a magnetic circuit including iron bar 118 positioned adjacent and around each of output wires 86 and 88 for slowing down or retarding the discharge of storage capacitor 26 by causing the discharge current to magnetize the mass of iron bar 118. While separate iron masses can be utilized around each of cables 86 and 88, a single iron bar 118 is preferably used, said iron bar 118 having openings 138 and 140 therein and therethrough for receiving and holding in place cables 86 and 88, respectively. Cables 86 and 88, as is clearly shown in FIGURE 4 of the appended drawings of course include insulation 142, and 144, respectively.

Furthermore, since iron bar 18 is in parallel with output cables 86 and 88 and since no splitting of cables 86 and 88 or any extra length of output wire is required in the form of a coil, additional savings in weight are accompanied by les heating and other inefficiencies of the heretofore known devices because of the increased length of high current carrying output wires.

Line power switch 120 having two normally open contact sets, or pairs, 122 and 124 may be provided for controlling the main power to apparatus 10. As an additional safety device, normally closed contact set, or pair, 126 may be gaged with normally open contact sets, or pairs, 122 and 124 for actuation by common actuating means therewith and connected with series discharge resistor 128, contact set, or pair, 126 and series resistor 128 being in parallel with storage capacitor 26 so that when line power switch 120 is turned off, contact sets, or pairs, 122 and 124 are opened, interrupting charging current to storage capacitor 26, and contact set, or pair, 126 simultaneously connects resistor 128 across said capacitor 26 to discharge it to preclude shock hazzards therefrom. Also, voltmeter 130 comprising resistor 132 and meter movement 134 may be connected across said capacitor 26 to determine the state of charge thereof.

Capacitors 136 and 138 may also be preferably connected across contactor contact sets 70 and 117 to eliminate arcing thereacross.

To decrease further the initial peak charging current, capacitor 137 may be connected across the output of charging circuit 24 so that when said capacitor 26 has been fully discharged, capacitor 137 will partially discharge into storage capacitor 26 at the start of the initial charging period and thereby preclude the effective presentation of a fully discharged capacitor 26 being applied across the input for any substantial time.

Preferred embodiments of this invention have been hereinbefore described, but many variations thereof will be readily apparent to those skilled in the art without departing from the spirit thereof. Therefore, it is intended that the foregoing shall be considered illustrative only and not construed in a limiting sense, the present invention being defined solely by the claims granted to me.

I claim:

1. A lightweight and portable electric welder for welding a conductive element held in the welding gun thereof to a second conductive element comprising, in combination, (1) isolating circuit means for connecting said welder with an electric power source and for isolating said welding gun from the earth ground of said power source, (2) storage capacitor means, (3) capacitor charging circuit means connected with said isolating circuit means and said storage capacitor means, said capacitor charging circuit means comprising, (i) transformerless voltage multiplier circuit means connected with said isolating circuit means for multiplying the output voltage of said isolating circuit means, (ii) voltage sensing circuit means operatively connected with said storage capacitor means for sensing the voltage impressed on said storage capacitor means, and (iii) charging control circuit means responsive to said voltage sensing circuit means for selectively connecting said storage capacitor means with said isolating circuit means, whereby said storage capacitor means is charged in a plurality of steps, thereby limiting the peak input current to said storage capacitor means, (4) discharge control circuit means for enabling said storage capacitor means to be controllably discharged through said conductive elements, said discharge control circuit means comprising (i) contactor means for selectively disconnecting said storage capacitor means from said charging control circuit means and connecting said capacitor with said conductive elements, and (ii) magnetic circuit means for controlling the rate of discharge of said storage capacitor means, said magnetic circuit means being in parallel with said storage capacitor means, and (5) output line means for connecting said discharge control means with said welding gun.

2. The electric welder of claim 1 wherein said capacitor charging circuit means includes rectifier means for rectifying current flow therethrough connected in series with said isolating circuit means, said isolating circuit means being adapted for connection with an alternating current power source, and said voltage multiplier circuit means includes voltage doubler circuit means for substantially doubling the voltage of said isolating circuit means, said charging control circuit means initially connecting said storage capacitor means with said isolating circuit means when the voltage of said storage capacitor means is substantially less than the voltage of said isolating circuit means and connecting said voltage doubler circuit means between said isolating circuit means and said storage capacitor means when the voltage of said storage capacitor means approaches the voltage of said isolating circuit means, whereby said storage capacitor means is charged to substantially double the voltage of said isolating circuit means.

3. The electric welder of claim 2 wherein said isolating circuit means includes a pair of input wires, a pair of output wires, a ground wire, and first relay means for enabling the input wire having a potential relative to ground to be connected automatically with a preselected one of said output wires, whereby earth ground is isolated from the welding gun, said relay means comprising operating coil means connected between one of said input wires and said ground wire for operating said relay means when said one input wire carries a potential relative to earth ground, and a pair of connection transfer means connected between one of said input wires and said pair of output wires for selectively connecting each of said input wires alternatively to said output wires.

4. The electric welder of claim 3 wherein said isolating circuit means also includes second relay means for precluding operation of said capacitor charging circuit means when said ground wire is improperly connected with earth ground, said second relay means including current interrupting contact means connected in series with at least one of said output wires, and operating coil means connected between said other of said output wires and said ground wire for enabling said current interrupting contact means to interrupt current flow through said output wires in the absence of a potential difference between said one output wire and said ground wire, and said isolating circuit means also includes a pair of rectifier means connected, respectively, with each of said operating coil means for precluding formation of a series current path therebetween and erroneous indication of proper grounding.

5. The electric welder of claim 2 wherein said voltage doubler circuit means includes, voltage doubling capacitor means connected between said isolating circuit means and said rectifier means for discharging in series with said isolating circuit means on alternate half cycles, further rectifier means connected in parallel with said voltage doubling capacitor means for enabling said voltage doubling capacitor means to be charged from said isolating circuit means on the other alternate half cycles and for precluding discharge of said voltage doubling capacitor means into said isolating circuit means during said alternate half cycles, whereby said voltage doubling capacitor is charged by said isolating circuit means and is discharged in series therewith on alternate half-cycles thereof.

6. The electric welder of claim 5 wherein said voltage sensing circuit means includes, additional relay means for connecting said voltage doubling circuit means between said isolating circuit means and said storage capacitor means, said additional relay means comprising operating means for enabling said additional relay means to be actuated, and variable resistor means for varying the voltage of said storage capacitor means at which the voltage doubling circuit means will be connected between said isolating circuit means and said storage capacitor means, said variable resistor means and said operating means of said additional relay means being connected in series across said storage capacitor means to enable a voltage of said storage capacitor means selected by said variable resistor means to operate said additional relay means.

7. The electric welder of claim 6 wherein said rectifier means includes controlled rectifier means for enabling the charging of said storage capacitor means to be terminated at a selected voltage lower than the output voltage of the voltage doubler circuit means and for enabling said storage capacitor means to be maintained at said selected voltage, said voltage sensing circuit means further including potentiometer resistance means for varying said selected voltage, additoinal rectifier means for precluding discharge of said voltage doubler capacitor through said potentiometer resistance means, said potentiometer resistance means and said additional rectifier means being connected in series with one another and in parallel with said second rectifier means, and other rectifier means connected in series between the arm of said potentiometer resistor and the gate of said controlled rectifier means for precluding improper polarity biasing from being applied to said gate.

8. The electric welder of claim 1 wherein said contractor means includes an operating coil and a plurality of contacts, and said discharge control circuit means includes manually operable switch means structurally associated with said welding gun for initiating discharge of said storage capacitor means, discharge limiting resistor means for limiting the discharge current of said storage capacitor means to a pilot arc current value, one termination of said limiting resistor means being connected with said storage capacitor means, further relay means responsive to said manually operable switch means for controlling connecting the other termination of said limiting resistor with said welding gun conductive element, said further relay means being also operatively associated with the operating coil of said contactor means whereby said operating coil is energized upon operation of said further relay means, output bus wire means connected with said welding gun and a contact of said contactor for direct connection of said one conductive element with said storage capacitor means upon operation of said contactor, and ground circuit output bus wire means adapted for connecting the other of said conductive elements with said storage capacitor means, whereby an initial pilot discharge of said storage capacitor means controlled by said limiting resistor means occurs through said conductive elements in response to actuation of said switch means followed subsequently by a full discharge of said storage capacitor means through said elements to provide a weld therebetween.

9. The electric welder of claim 8 also including motor means operatively associated with said contactor means for causing a separation of said conductive elements during the occurrence of said pilot discharge.

10. The electric welder of claim 9 wherein said motor means includes a solenoid coil connected in parallel with the operating coil of said contactor means and in series with a normally closed sontact pair of said contactor, whereby operation of said further relay means energizes said solenoid for separating said conductive elements and full operation of said contactor means de-energizes said solenoid.

11. The electric welder of claim 10 wherein the operating means of said further relay means is connected in series with said conductive elements, to allow operation of the further relay means only when the two conductive elements are in contact, together with spring means associated with said solenoid for biasing said conductive elements into contact.

12. The electric welder of claim 1 wherein said discharge control circuit means includes a pair of output bus wires for connecting said storage capacitor means with said conductive elements, and said magnetic circuit means includes a ferro-magnetic bar structurally magnetically associated in parallel with said output bus wires and electrically insulated therefrom, whereby the rate of discharge of said storage capacitor through said conductive elements is controlled.

13. The electric welder of claim 1 also including manual switching means operably associated with said source of power for disconnecting said source of power from said isolating circuit means, and discharge resistor means for discharging said storage capacitor means, said manual switching means being operably associated with said discharge resistor means and said storage capacitor means for establishing a connection therebetween when disconnecting said source of power, whereby a controlled discharge of said storage capacitor means occurs upon disconnection of said source of power.

References Cited

UNITED STATES PATENTS

| | | | |
|---|---|---|---|
| 3,035,219 | 5/1962 | Friedman | 320—1 |
| 3,291,958 | 12/1966 | Glorioso | 219—98 |
| 3,319,039 | 5/1967 | Glorioso | 219—113 X |

RICHARD M. WOOD, *Primary Examiner.*

CHARLES M. CHADD, *Assistant Examiner.*

U.S. Cl. X.R.

219—113; 320—1